United States Patent [19]

Gros

[11] Patent Number: 4,831,962

[45] Date of Patent: May 23, 1989

[54] DEVICE FOR TRANSPORTING OBJECTS WHICH PASS WITHIN TANKS, A METHOD OF CONVEYING OBJECTS AND AN INSTALLATION FOR TREATMENT OF OBJECTS

[75] Inventor: Jacques Gros, Fontenay Sous Bois, France

[73] Assignee: Societe Industrielle d'Equiptment Technique d'Appareils de Manutention, Viry Chatillon, France

[21] Appl. No.: 919,070

[22] Filed: Oct. 15, 1986

[30] Foreign Application Priority Data

Oct. 18, 1985 [FR] France .................... 85 15465

[51] Int. Cl.[4] .............. B05C 3/10; B05C 13/00; B05D 1/18
[52] U.S. Cl. .................... 118/423; 118/500; 198/465.3; 198/617; 198/687
[58] Field of Search ............ 134/128; 198/681, 465.3, 198/617; 118/423, 500; 427/430.1, 435

[56] References Cited

U.S. PATENT DOCUMENTS 2,409,400 10/1946 Telford .................... 198/618
4,402,765 9/1983 Goto et al. .................... 118/423 X Primary Examiner—John McIntosh
Attorney, Agent, or Firm—Bucknam and Archer

[57] ABSTRACT

A device for transporting objects to be passed through treatment tanks includes two laterally spaced overhead conveyors between which each object moves along a path of travel at a distance from the vertical planes of the conveyors and pendulums freely suspended at the upper ends thereof by means of articulation members coupled with driving members provided respectively for each conveyor. The pendulums associated in a pair on each conveyor in the same plane of progression are provided at the free ends thereof with members for suspending carrier frames designed to support the objects to be treated. Each carrier frame thus cooperates with at least two pendulums respectively associated with each conveyor.

10 Claims, 6 Drawing Sheets

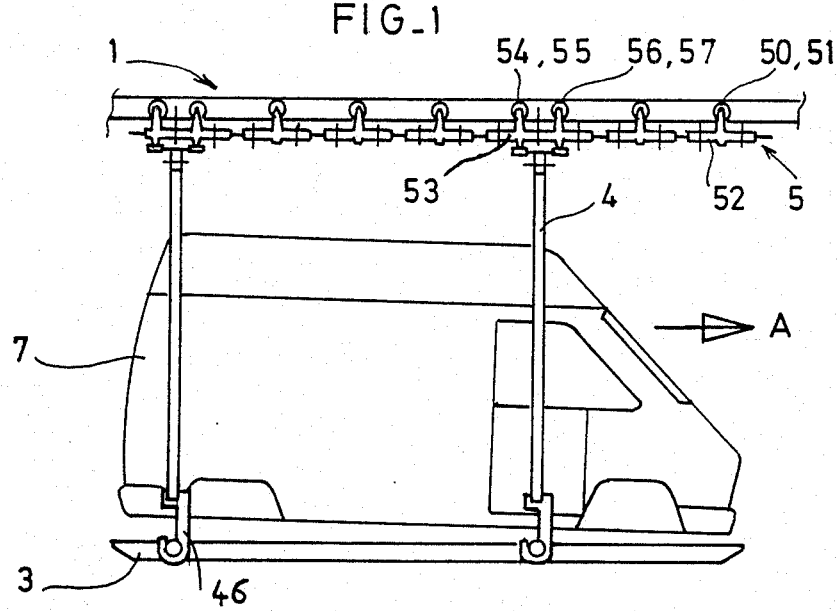
FIG_1
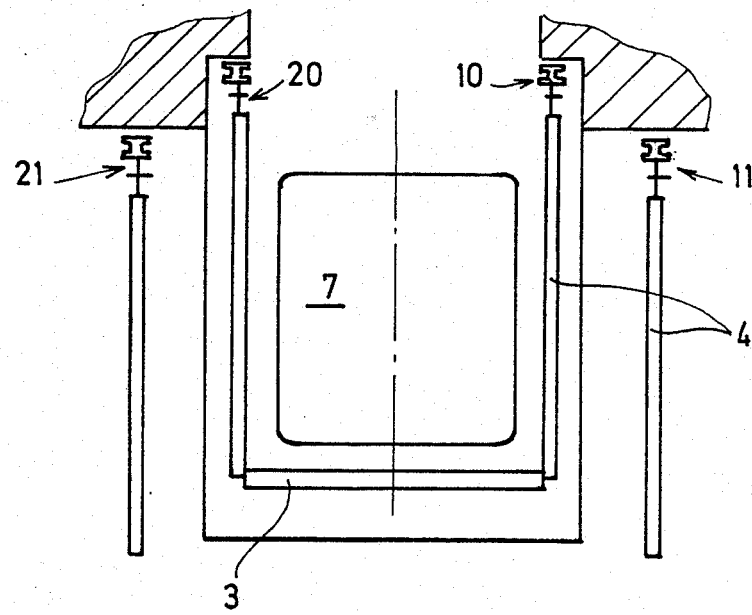
FIG_2

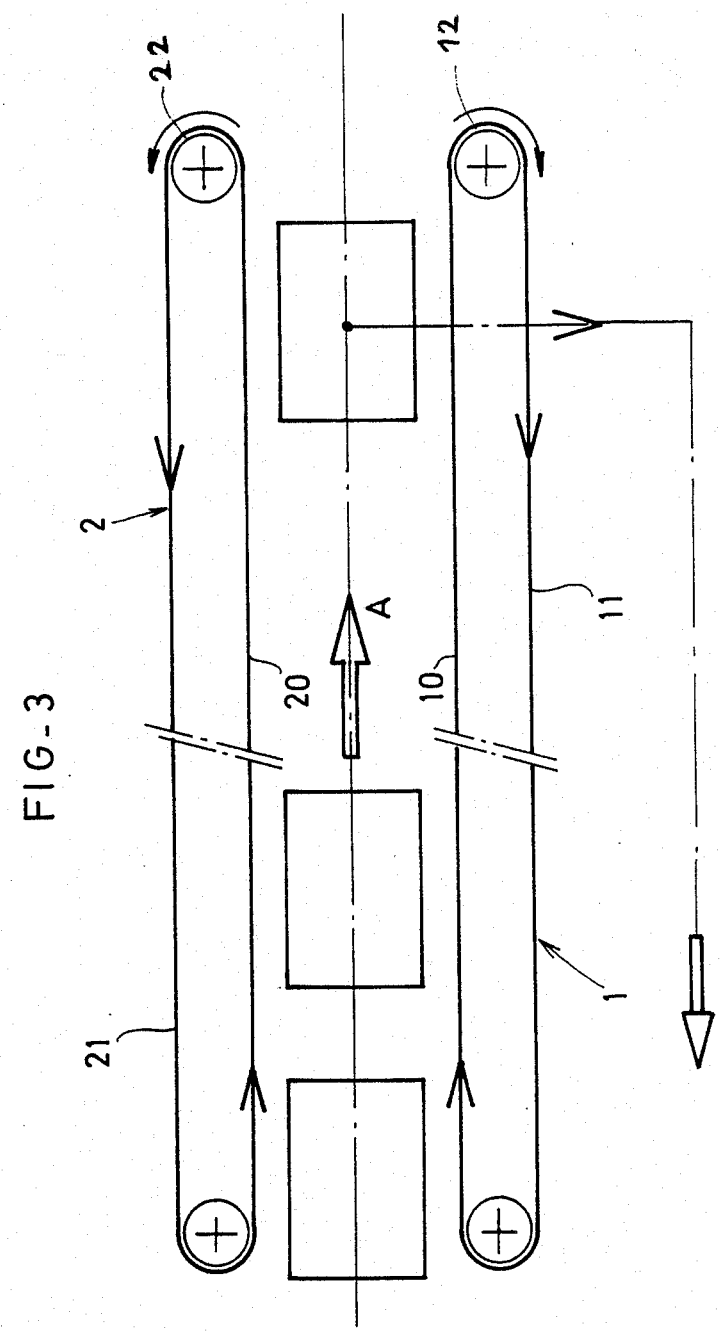

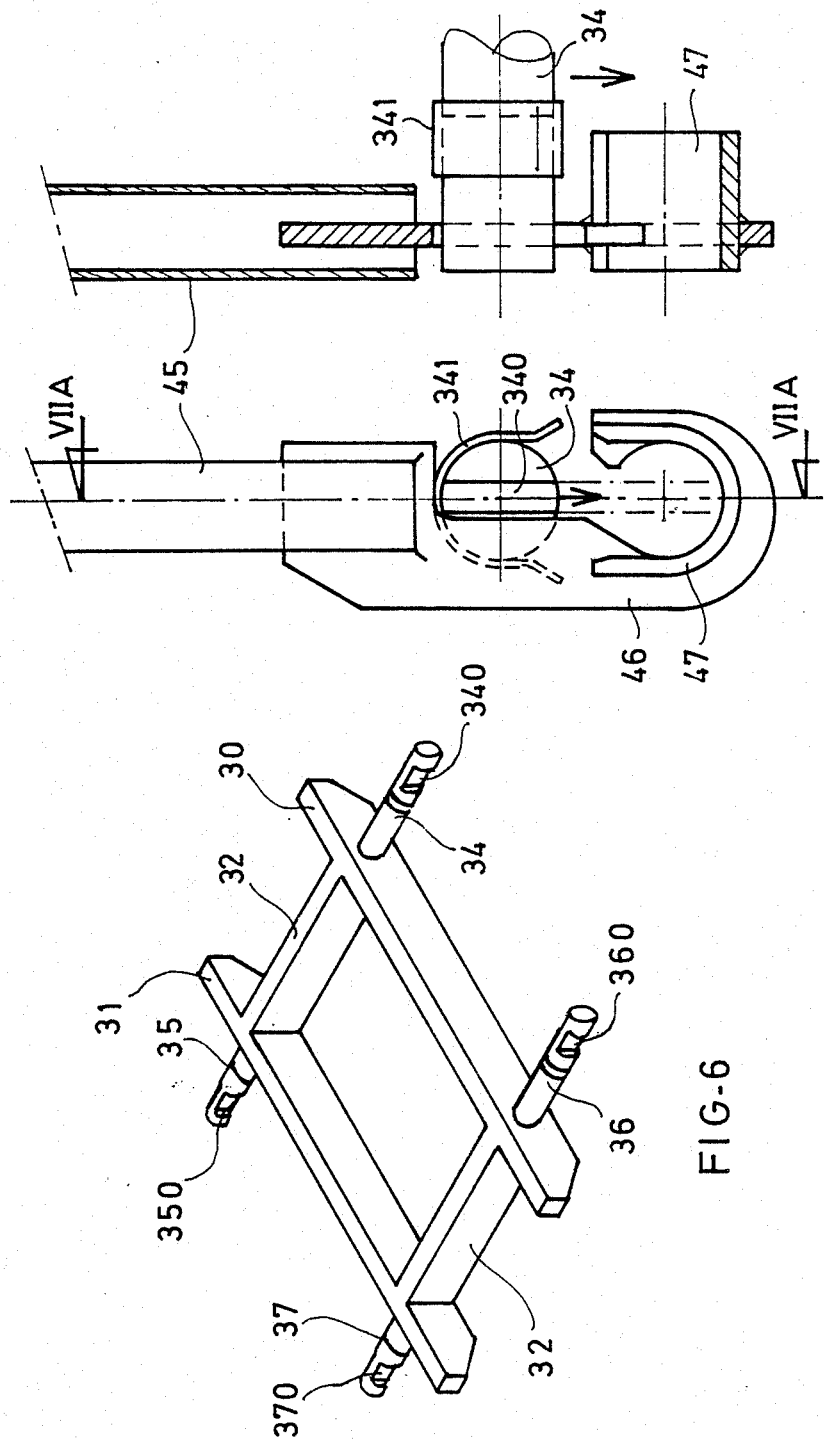

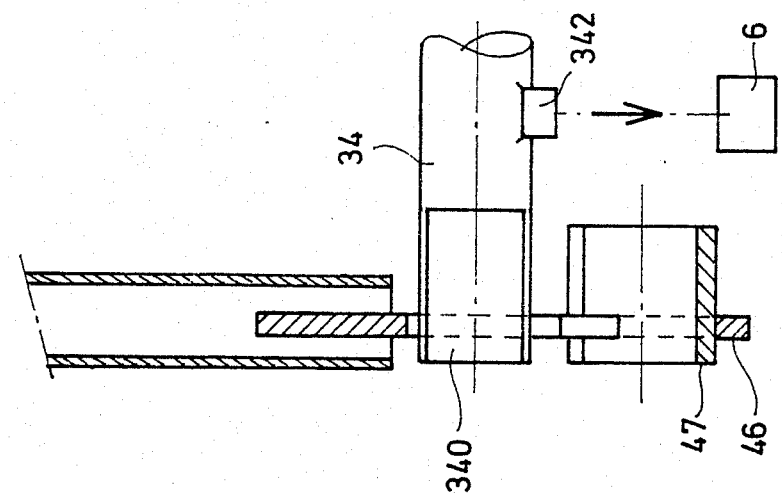
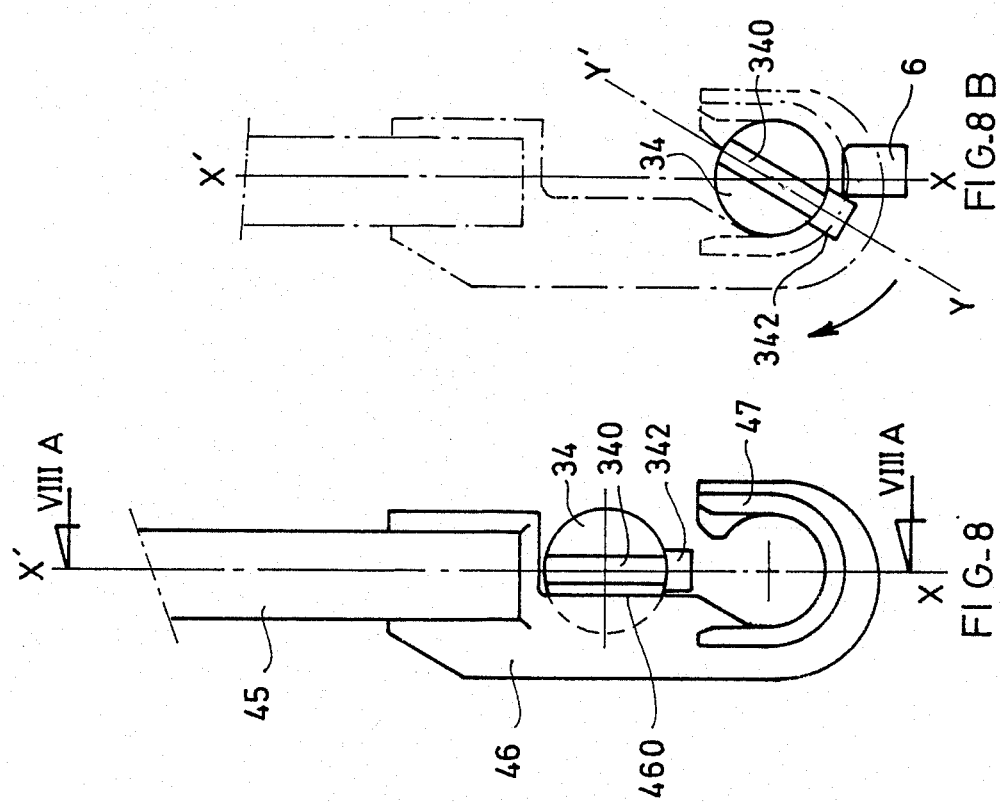

DEVICE FOR TRANSPORTING OBJECTS WHICH PASS WITHIN TANKS, A METHOD OF CONVEYING OBJECTS AND AN INSTALLATION FOR TREATMENT OF OBJECTS

BACKGROUND OF THE INVENTION

1. Field of the Invention

The present invention relates to a device for transporting objects on carrier frames, to a method of conveying for the practical application of said device and to the corresponding installation for treatment of objects.

2. Description of the Prior Art

The type of device in accordance with the invention is primarily intended to be employed for transporting parts to be subjected to a surface treatment within treatment tanks. A particular application which can be mentioned by way of non-limitative example is the painting of motor vehicles.

There already exist conveying devices having laterally spaced tracks for displacement of rigid-frame rockers or U-shaped cradles which are placed transversely to the direction of displacement of objects. These rockers or cradles serve to support carrier frames on which objects are placed and which are rigidly fixed to said rockers or cradles by suitable means. In devices of this type, the two tracks are connected to each other by means of the rigid rockers or cradles. For the return travel of these rockers or cradles, it is consequently necessary to provide a second device which is parallel to the first and operates on the same principle but in the opposite direction with two similar tracks. This entails the need for particularly complex installations which take up considerable space, thus resulting in high construction and operating costs. The same complexity is again involved in the transfer systems which are provided at both ends of the circuit in order to move the rockers from the treatment chain to the chain for returning empty rockers. At this location, the rigid frameworks of the rockers (or of equivalent cradles) entails the need for long radii of curvature. Moreover, the rigid rockers (and also the cradles) do not make it possible to approach guide ramps having steep slopes at the entrance and at the exit of tanks for the treatment of objects whereas an increase in the angle of slope of such ramps would permit a reduction in length of the treatment circuits, with even more appreciable advantages arising from the fact that the treatment operation is usually performed in a tunnel.

SUMMARY OF THE INVENTION

A first object of the invention is to propose a device for overcoming the disadvantages noted in the foregoing.

This first aim is achieved by means of a device for transporting objects which pass within tanks for the treatment of said objects, provision being made for two overhead conveyors in laterally spaced relation between which the object is moved along a path of travel at a distance from the vertical planes of said conveyors. The device in accordance with the invention essentially comprises pendulums freely suspended at the upper ends thereof by means of articulation members coupled with driving members provided respectively for each conveyor. Said pendulums associated in a pair on each conveyor in the same plane of progression are provided at the free ends thereof with members for suspending carrier frames designed to support the objects to be treated. In this manner, each carrier frame cooperates with at least two of said pendulums respectively associated with each conveyor.

In accordance with another distinctive feature of the invention, each carrier frame has arms which project in the object support plane on each side of said frame. Said arms are adapted to cooperate with the suspension members in such a manner as to ensure that the pendulums support the carrier frames by means of said arms while conveying is in progress and are located practically in the vertical planes of said conveyors.

As an advantageous feature, the arms are telescopic with a maximum span corresponding to the maximum distance between the two conveyors so as to ensure that the points of suspension of the carrier frames on the pendulums remain practically continuously in the vertical planes of the conveyors in spite of any possible variations in distance between said conveyors.

A further object of the invention is to guard against any potential danger of floating of objects transported by the carrier frames within the tanks. This second object is achieved by the fact that each carrier frame is suspended from the pendulums by means of a locking system which effectively prevents any possibility of floating.

A third object of the invention is to guard against the danger of floating while at the same time facilitating transfer at the entrance and at the exit of the treatment path.

This third object is achieved by the fact that the locking system is constituted by an open sleeve supported by each pendulum at the lower end thereof and by a flat face provided at the end of each carrier frame arm. Said flat face has a width corresponding to the opening of the sleeve and is adapted to support a U-shaped resilient clip which embraces the exterior of the sleeve when suspension of the carrier frame from the pendulums is completed.

In accordance with another distinctive feature, the locking system is automatically released by relative displacement of the carrier frame with respect to the pendulum at the end of the treatment travel.

In a second embodiment, the locking means are constituted by an open sleeve supported by each pendulum at the lower end thereof and a flat face formed at the end of each rotatable telescopic arm. Each flat face having a width corresponding to the opening of the sleeve is driven in rotation after introduction within the sleeve by means of fixed stops placed on the conveying path, each stop being intended to produce action on a lug which is rigidly fixed to each telescopic arm.

In this second embodiment, the locking system is released by means provided either on the conveying path or on lifting platforms so as to return the flat face to a position such that its axis of symmetry is aligned with the axis of symmetry of the opening of the sleeve.

The invention is also directed to a method of conveying carried out by the device for transporting objects. The aim just mentioned is achieved by the fact that the method of conveying carried out by the object-transporting device essentially consists in:

presenting a carrier frame at the entrance of the path of travel formed by two overhead conveyors each adapted to move pendulums in a closed circuit, said carrier frame being supported at a height above the height of the pendulum suspension members;

producing a relative displacement between the carrier frame and the pendulums as soon as said pendulums come into contact with the arms of the carrier frame in order to initiate suspension;

carrying out locking of the carrier frame by means of a system provided for this purpose;

conveying the objects by means of the transporting device;

unlocking the carrier frames at the end of the transporting device;

producing a relative displacement between the pendulums and the carrier frames in order to detach them from said pendulums;

moving the carrier frames away from the end of the path of travel.

Finally, the invention also includes within its scope the installation for treatment of objects within tanks equipped with the transporting device aforesaid. In an installation of this type, each conveyor has a treatment path for passing the object through the tank and a return path for pendulums which have been released from all suspension. Each conveyor thus constitutes a closed circuit for pendulums which travel first along a path for conveying carrier frames through the tank and then along the return portion or external run of the conveying path on each side of each conveyor.

BRIEF DESCRIPTION OF THE DRAWINGS

FIG. 1 is a side view of the transporting device.

FIG. 2 is a schematic end view of the transporting device.

FIG. 3 is a schematic top view of the path of travel of the objects.

FIG. 6 is a perspective view of the carrier frame with side arms.

FIG. 7A is a side view showing the lower end of one of the pendulums in a first embodiment.

FIG. 7B is a side view showing the lower end of the pendulum in accordance with this first embodiment.

FIG. 8 is a side view showing the lower end of the pendulum in a second embodiment.

FIG. 8A illustrates the locking stage for said second embodiment.

FIG. 8B is another side view showing the lower end of the pendulum in accordance with said second embodiment.

DESCRIPTION OF THE PREFERRED EMBODIMENTS

Figure 4:
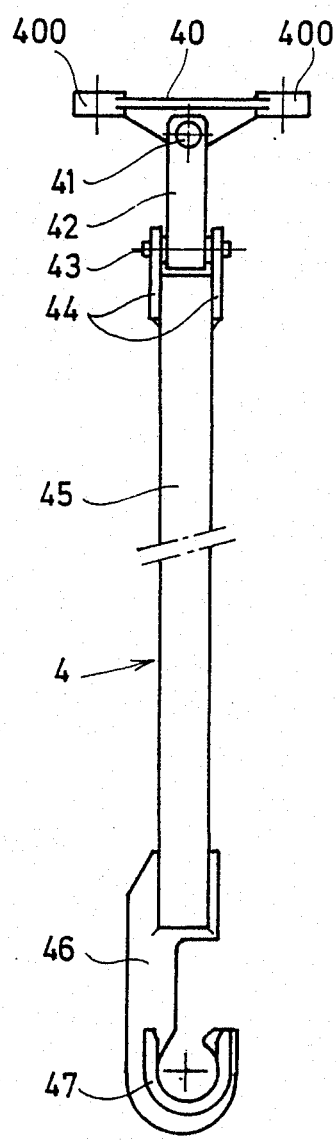
FIG. 4 is a side view of the pendulum.

The device in accordance with the invention will now be described with reference to FIGS. 1 to 6.

In FIG. 1, the device for transporting objects 7 consisting of vehicle bodies, for example, includes a carrier frame 3 which is suspended from the ends of pendulums 4.

The transporting device (shown in FIGS. 2 and 3) is made up of two laterally spaced conveyors 1 and 2 between which the object travels along a path 10, 20 at a distance from vertical planes of the conveyors. A conveyor chain travels on said conveyors. The spacing between the two conveyors is such that the object is permitted to travel within the installation without ever being located directly beneath said conveyors and thus being exposed to the danger of pollution by drops of oil or grease which fall from the conveyor.

Figure 5:
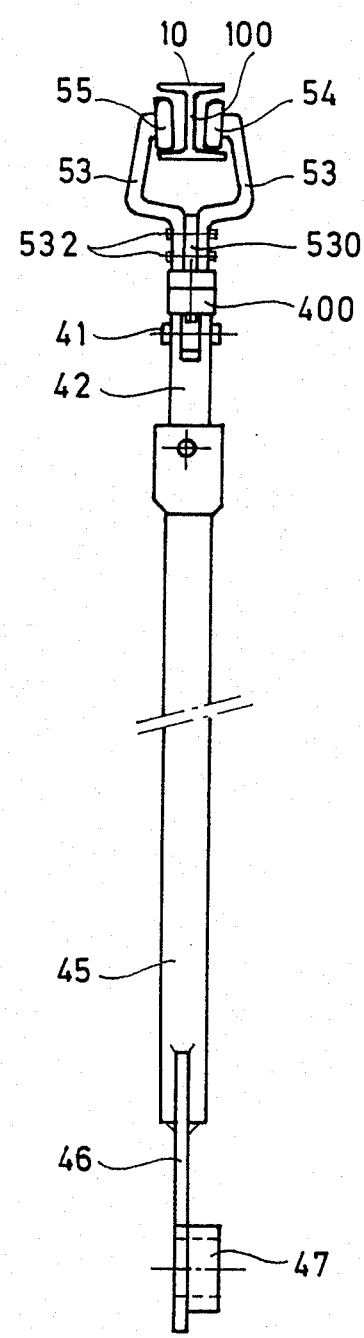
FIG. 5 is a side view of the pendulum looking in a direction parallel to the path of travel of the objects.

As shown in FIGS. 1, 2 and 5, the conveyors 1, 2 are provided with tracks consisting of monorails 10, 20 of a conventional type in conveyor systems and having an I-shaped cross-section which defines two symmetrical grooves. The conveyor chain travels on said monorails and is formed by interconnected links 52 with trolleys 53 placed in uniformly spaced relation between the links. The trolleys 53 support the carrier-frame suspension pendulums 4. The chain links 52 are hinged together and suspended from the monorails 10-11, 20-21 by means of rollers 50-51 placed on each side of the central partition 100 of the monorails. The trolleys 53 are provided with two pairs of rollers 54-55, 56-57 placed on each side of the central monorail partition 100. Bolts 530 rigidly fixed to the trolley 53 by means of cotter-pins 532 are provided with threaded ends on which are mounted sleeves 400 placed at each end of an articulation member 40 in the form of a balance beam from which the pendulums are suspended.

Each pendulum has a main arm 45 and is connected at the upper end to one of the trolleys of the conveyor chain by means of articulation members 40 to 43, thereby ensuring that the pendulums are maintained in each case in a substantially vertical position irrespective of the angle of slope and position of the conveyors.

In one practical design which is considered by way of example and not in any limiting sense, the above-mentioned articulation members can be constructed by means of universal-joint assemblies of the type usually employed in overhead conveyor installations. These universal-joint assemblies are formed by a number of different cooperating parts.

The central portion of the articulation member 40 (shown in FIG. 4) is fitted with a pivot-pin 41 on which is mounted an intermediate rod 42 having a second pivot-pin 43 placed at right angles to the pivot-pin 41. Said pivot-pin 43 is also parallel to the trolley and to the direction of displacement of the conveyor. The main arm 45 of the pendulum is mounted on said pivot-pin 43 by means of two side-plates 44.

At the lower end, each pendulum 4 is provided with a suspension member 46 which is rigidly fixed to the main arm 45 of the pendulum by any means known to those versed in the art. Said suspension member 46 is adapted to carry a sleeve 47 placed along the axis of symmetry of the pendulum arm 45. This axis of symmetry in turn passes through the axis of symmetry of the pivot-pin 41.

The suspension members placed at each lower end of the pendulums are intended to cooperate with the object carrier frame in such a manner as to be capable of supporting said carrier frame in its path of travel through the treatment tank.

The carrier frame 3 shown in FIG. 6 is constituted by two skids 30-31 which are parallel to the path of travel of objects and are joined together by means of cross-beams 32 so as to form an object support plane. The carrier frame 3 thus formed is provided on each side of the support plane with arms 34-35, 36-37 which project in pairs on each side of the skids in the line of extension of the cross-beams and are adapted to cooperate at their free ends with the pendulum suspension members. The free end of each arm is provided with a flat face which is designated respectively by the reference numerals 340-350, 360-370 and is adapted to come into contact with each sleeve 47 of the suspension members at the time of positioning of the carrier frame for object suspension.

In a preferred type of construction, the carrier-frame arms are equipped with a telescopic system in which one end of a rod is provided with the above-mentioned flat face and the other end of the rod is capable of sliding within a guide rod attached to the carrier frame. These two rods are coaxial and make it possible to increase the spacing of the suspension members respectively on each side of the carrier frame, thereby ensuring that the suspension points established by the contact between flat face and sleeve always remain vertically beneath the conveyors.

The distance between each conveyor cannot readily remain constant throughout the installation, with the result that the pendulums are subjected to stresses when they support the carrier frame. The presence of telescopic arms makes it possible without any attendant disadvantage to absorb relatively substantial differences in spacing between the two overhead conveyors.

Finally, in order to prevent disengagement of the flat faces from the sleeves when the object enters the treatment tank and has a tendency to float, means are provided for locking the carrier-frame arms on the suspension hooks in order to eliminate any risk of detachment. Said locking means will hereinafter be described in detail.

The object-transporting device as described in the foregoing is particularly well suited for use in an object treatment installation.

As shown in FIGS. 2 and 3, an installation of this type has a treatment path 10, 20 which permits displacement of objects to be transported in the direction of the arrow A. At one end of this path of travel, the carrier frame is loaded on the suspension hooks of the pendulums. As a result of displacement of the trolleys 53 by the chain in the rails 1, 2, the object is moved into a treatment tank. The object is subjected to the desired operation and then transferred to the end of the path 10 for subsequent unloading. At this end of the path, the installation is provided with chain-guiding means 12, 22 which permit engagement of the pendulums in a return path 11, 21 in which they are left free without any suspending function. In the case of each conveyor, this return path is located on each side of the treatment path. There is thus provided a closed loop for circulating pendulums which follow a suspension path and then a return path to the starting point of the object run. In accordance with the invention, this closed circuit has the advantage of minimum space requirements since the return travel takes place on each side of the treatment path without any need to provide large spaces around the tank.

The system for locking the carrier-frame arms on the suspension hooks of the pendulums 45 will now be explained in detail with reference to FIGS. 7A and 7B.

In FIG. 7A, there can be seen the flat face 340 of one of the arms of the carrier frame shortly before it comes into contact with the suspension member 46 which supports the sleeve 47 at its lower end. As shown in FIG. 7B, said flat face is adapted to support a U-shaped clip 341 consisting of a resilient metal part which makes it possible at the time of relative displacement of the carrier frame 3 with respect to the lower ends of the pendulums 4 to ensure centering of the flat face 340 with respect to the opening of the sleeve 47. In fact, as is apparent from FIG. 2, the path 11, 21 of return travel of the pendulums 4 is not as a rule located at the same level as the path 10, 20 of outward travel of the same pendulums since it does not have to follow the upward and downward slopes of the tanks. At the entrance end of the treatment loop, the carrier frames 3 may be presented at a fixed height. When the pendulums are moved by the guiding means 12, 22 from the paths 11 and 21 respectively to the paths 10 and 20 respectively while undergoing an upward displacement, the sleeves 47 of the pendulums move upwards progressively so as to reach the height of the flat faces 340 which engage within said sleeves. At the time of engagement, the clip 341 serves on the one hand to ensure centering of the flat face with respect to the opening and on the one hand to provide a clamping action for ensuring that the flat face 340 is retained within the sleeve 47. This retention serves to guard against problems of flotation as suspended vehicles and carrier frames pass through the treatment tank 9 (as shown in FIG. 9).

A second embodiment of the locking means is illustrated in FIGS. 8, 8A, 8B. In this second embodiment, provision is again made for a bottom suspension member 46, the front face 460 of which is located in the line of extension of the opening of the sleeve 47. Said sleeve 47 is placed at the end of the member 46 so as to ensure that its axis of symmetry is aligned with the axis of symmetry of the main bar 45 of the pendulum and with the axis of symmetry of the pivot-pin 41. At the time of relative displacement of the ends of the pendulums with respect to the arms of the carrier frames, the flat faces 340-350, 360-370 are applied against the surfaces 460 of the pendulums and are guided by these surfaces so as to be introduced within the internal bore of the sleeve 47. When the flat faces 340 to 360 of the carrier-frame arms rest on the sleeves 47 of the pendulums 4, the carrier frames are suspended. As is apparent from FIG. 8, the lower ends of the carrier-frame arms are each provided with a lug 342 which makes it possible after suspension of the carrier frames to produce a movement of rotation of the arm 34 within the sleeve 47 since said arm is telescopic, thereby ensuring that the axis of symmetry of the flat face 340 is no longer aligned with the opening of the sleeve 47, as shown in FIG. 8B. This is readily achieved by means of a fixed stop 6 which is placed on the path of the lugs 342 after the carrier-frame suspension steps, as illustrated in FIG. 9.

Figure 9:
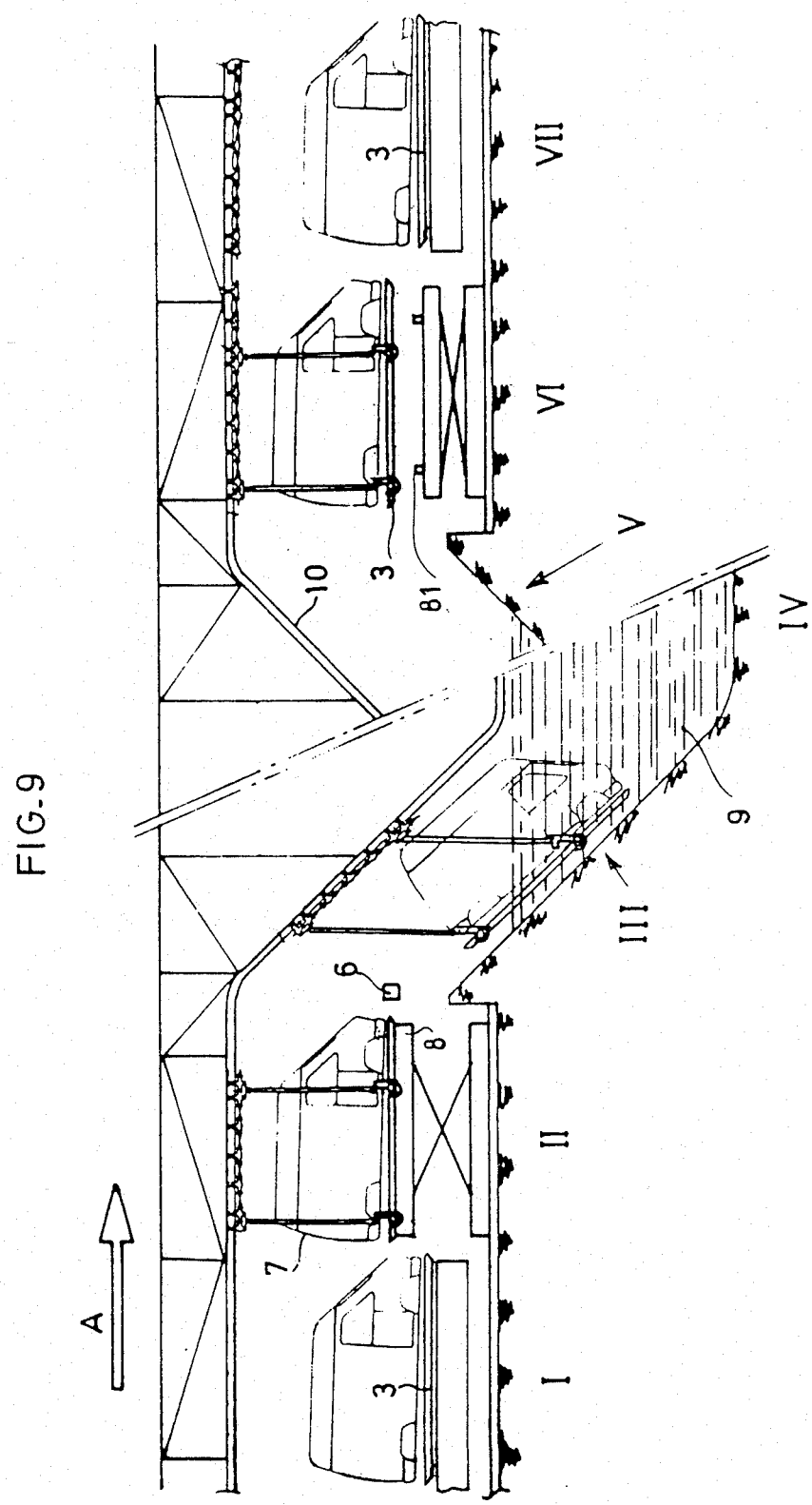
FIG. 9 is a side view of the installation for treatment of objects.

In this second embodiment, releasing of the carrier frames from the pendulums can be performed at the exit end of the treatment path by positioning lifting platforms 8 (shown in FIG. 9). Said platforms are provided with studs 81, the function of which is to ensure that the axis of symmetry Y-Y' of the flat faces 340 to 360 again coincides with the axes of symmetry X-X' of the openings of the sleeves 47. Once the unlocking operation has been performed in this manner or by any other suitable means, the carrier frames can be detached from the pendulums either by maintaining them on fixed platforms and producing a downward displacement of the pendulums as shown in FIG. 2 when the pendulums located on the track 10 subsequently pass onto the return track 11 or by producing an upward displacement of the carrier-frame supporting platform 8.

In the first mode of execution of the locking operation, unlocking or releasing of the carrier frames from the pendulums is performed simply by relative displacement of the carrier frames supported by a platform and of the carrier-frame suspension pendulums.

FIG. 9 illustrates the steps of the method of conveying which is carried out by the device for transporting objects and the application of this method to treatment of vehicle bodies. This figure illustrates a treatment tank 9 and the outgoing conveying path 10 of the transporting device.

At the stage defined by a numeral I, the carrier frames 3 for supporting the vehicle bodies 7 are transported by a rolling table to the entrance of the object-transporting device. For stage II, the carrier frames are placed on lifting platforms 8. The arms of these carrier frames are brought to an upper level of the sleeves for suspension of the pendulums 4. By lowering the lifting platform 8, the carrier frame 3 is accordingly suspended within the sleeves of each pendulum 4. At this stage, the carrier frames are locked on the pendulums in the first locking mode. In the case of the second locking mode, the pendulum and carrier frame assembly which is transported between stages II and III of FIG. 9 encounters the fixed stops 6 which are placed on the path of the carrier-frame arms. When a contact is established, this accordingly produces a rotational displacement of the free rod of the telescopic system of the arms.

Stages III and V represent the access and exit ramps for objects being conveyed to the treatment tank 9. It may be noted from this figure that the form of construction of the conveyor system permits steep slopes of the order of 45 degrees by virtue of the cardan-type coupling of the pendulums with the conveyor trolleys and also as a result of the coupling provided between the pendulums and the carrier frame.

Stage IV corresponds to the step involving treatment of objects within the tank 9 which contains the treatment fluid.

The operation involved in stage VI consists in depositing the carrier frame on a platform 8. At the time of utilization of the second locking mode, the studs 81 of the platform 8 make it possible in this stage to bring back the flat faces 340 to 360 of the rotatable telescopic arms to a position such that the axes of symmetry of said flat faces coincide with the axes of symmetry of the sleeves 47 as explained earlier. Unlocking is thus carried out in this stage. The next operation consists in producing a relative displacement of the carrier frames with respect to the sleeve for suspension of pendulums 4. This displacement is initiated by raising a platform 8 or alternatively by lowering the pendulum-conveying track so as to bring the pendulums to the level of the return path 11, 21. In stage VII, the carrier frames are moved away from the end of the path by a rolling table.

The present invention therefore provides a treatment installation which has small space requirements and can readily be adapted to any treatment operation as applicable in particular to vehicle bodies.

It will naturally be understood that the invention is not limited in any respect to the features specified in the foregoing or to the particular constructional details which have been chosen by way of explanatory illustration. The particular embodiments and constituent elements described in the foregoing solely by way of example may be extended over a wide range of alternative forms without thereby departing either from the scope or the spirit of the invention. It accordingly follows that the broad purview of the invention covers all means which are technically equivalent to those described as well as all combinations of such means.

What is claimed is:

1. A device for transporting objects along a path of travel which comprises:
    a rigid carrier frame (3) providing a support plane for each object comprising at least four points of suspension, each point being associated with a rigid arm (34, 35; 36, 37;) which projects on each side of said frame in the support plane thereof, at least two arms extending at a forepart of said carrier frame and at least two arms at a rear part,
    two overhead conveyors (1, 2) in laterally spaced relation on each side of said object, said object moving along the path of travel (10,20) at a distance from the vertical planes of said conveyors,
    driving members associated respectively with each conveyor,
    two series of rigid pendulums (4), each pendulum having an upper end individually coupled by articulation members with said driving members and comprising cooperating suspension means (46) at each free lower end of said pendulum adapted to engage with an arm of said frame,
    means to move synchronously the pendulums associated by pairs on the two conveyors, whereby the pendulums support the carrier frame while conveying said objects, said pendulums being maintained in a substantially vertical position irrespective of the angle of slope and position of said conveyors.

2. The transporting device according to claim 1, wherein said arms of said carrier-frame are telescopic with a maximum span corresponding to the maximum distance between said two conveyors so as to ensure that the points of suspension of the carrier frame on the pendulums remain essentially continuously in the vertical planes of said conveyors in spite of any possible variations in distance between said conveyors.

3. The transporting device according to claim 1, wherein the pendulums are pivotally attached to said driving members by means of universal-joint assemblies, said driving members placed on each conveyor being associated in pairs on the same conveyor, the distance between two driving members corresponding essentially to the distance between axes of the carrier-frame arms located on one and the same side of the carrier frame.

4. The transporting device according to claim 1, wherein each carrier frame is provided with a locking system.

5. The transporting device according to claim 2, wherein each carrier frame has a locking system, the locking system is constituted by an open sleeve supported by each pendulum at the lower end thereof and by a flat face formed at the end of each rotatable telescopic arm, each flat face having a width corresponding to the opening of the sleeve and being driven in rotation after introduction within the sleeve by means of fixed stops placed on the travel path, the lower ends of said carrier-frame arms being provided with lugs, each stop being intended to produce action on each of said lugs.

6. The transporting device according to claim 5, wherein the locking system is released by means located on the travel path.

7. The transporting device according to claim 5, wherein the locking system is released by carrier-frame lifting and docking platforms adapted to return the flat face to a position whereby its axis of symmetry is aligned with the axis of symmetry of the sleeve opening.

8. An installation for treatment of an object with a transporting device according to claim 1, wherein said device has a tank, each conveyor has a treatment path for passing the object through said tank and a return path for the pendulums which have been released from all suspension, each conveyor forming a closed circuit for pendulums which travel first along a path for conveying said carrier frame through said tank and then along the return portion or external run of the conveying path on each side of each conveyor.

9. A treatment installation according to claim 8 wherein the installation includes lifting tables to be placed at the ends of the conveyors at the level of the entrance of the treatment path of travel.

10. A method of conveying an object along a path of travel for treatment in a tank, in a device comprising a rigid carrier frame for said object comprising at least four points of suspension, two overhead conveyors in laterally spaced relation on each side of said object, said object moving along the path of travel at a distance from the vertical planes of said conveyors, driving members associated respectively with each conveyor, two series of pendulums freely suspended at upper ends thereof by articulation members coupled with said driving members and comprising cooperating suspension means at each lower end of said pendulum associated for each series at a forepart and a rearpart of the carrier frame, means to move synchronously pendulums associated by pairs on the two conveyors, wherein each carrier frame has arms which project in the support plane of said object on each side of said frame, said arms being adapted to engage with said suspension means whereby the pendulums support the carrier frames while conveying said object, said arms of said carrier-frame being telescopic with a maximum span corresponding to the maximum distance between said two conveyors, said carrier frame has a locking system, which consists of presenting a carrier frame at the entrance of a path of travel formed by said two overhead conveyors each adapted to move pendulums in a closed circuit, said carrier frame being supported at a height above the height of the pendulum suspension members;

producing a relative displacement between the carrier frame and the pendulums as soon as said pendulums come into contact with the telescopic arms of the carrier frame in order to initiate suspension;

carrying out locking of the carrier frame;

conveying the object along said path of travel at the end of the device;

producing a relative displacement between the pendulums and the carrier frame in order to detach it from said pendulums;

moving the carrier frame away from the end of the path of travel.

* * * * *